United States Patent [19]

Mochida

[11] Patent Number: 4,753,475
[45] Date of Patent: Jun. 28, 1988

[54] ARRANGEMENTS FOR RESTRAINING HOODS OF VEHICLE BODIES

[75] Inventor: Kenji Mochida, Hiroshima, Japan
[73] Assignee: Mazda Motor Corporation, Japan
[21] Appl. No.: 60,415
[22] Filed: Jun. 11, 1987
[30] Foreign Application Priority Data Jun. 16, 1986 [JP] Japan .................. 61-91435[U]

[51] Int. Cl.⁴ ............................................. B62D 25/10
[52] U.S. Cl. ..................................... 296/192; 296/188; 296/194; 180/69.21
[58] Field of Search ...................... 296/192, 194, 188; 180/69.21, 271

[56] References Cited

U.S. PATENT DOCUMENTS 3,643,755  2/1972  Gionet et al. .......................... 296/76
3,938,610  2/1976  Harman ............................. 180/69.21
4,270,793  6/1981  Harasaki et al. ...................... 296/192
4,579,185  4/1986  Wakasa ............................ 180/69.21

FOREIGN PATENT DOCUMENTS 54-6181  3/1979  Japan .

Primary Examiner—Robert R. Song
Attorney, Agent, or Firm—Gerald J. Ferguson, Jr.

[57]        ABSTRACT

An arrangement for restraining a hood of a vehicle body comprises a junction member attached to a corner portion of the vehicle body, where an end portion of a cowl panel extending along a lower end portion of a front windshield is coupled with a wheel apron member, for reinforcing the corner portion, and a hook member projecting from an inner surface of the hood which is provided for opening and closing an opening, such as creating an engine room, formed in the vehicle body in front of the cowl panel, so as to be positioned to face the junction member when the hood is positioned to close the opening. The hook member engages with the junction member in the case where the hood is moved toward a cabin space formed in the vehicle body behind the cowl panel.

11 Claims, 3 Drawing Sheets

ARRANGEMENTS FOR RESTRAINING HOODS OF VEHICLE BODIES

BACKGROUND OF THE INVENTION

1. Field of the Invention

The present invention relates generally to arrangements for restraining hoods of vehicle bodies, and more particularly, to a structural arrangement for restraining a hood provided on a vehicle body by which the hood is prevented from moving into a cabin space formed in the vehicle body when an external force affects the hood to push the same toward the cabin on the occasion of, for example, collision of the vehicle body with another.

2. Description of the Prior Art

There have been proposed various structural arrangements for preventing a hood which is provided for closing an opening on a vehicle body for forming an engine room, trunk room or the like from moving into a cabin formed in the vehicle body on the occasion of collision of the vehicle body with another. In one of such structural arrangements in the vehicle body, such as disclosed in the Japanese utility model application published before examination under publication No. 54-6181, a hook incorporated with a hinge which supports the hood on the vehicle body to open and close the engine room is provided to be able to engage with a stopper formed on a part of the vehicle body. With this structural arrangement for restraining the hood, when the hood is pushed to be moved backward to the cabin space, the hook is caused to engage with the stopper and thereby the hood is restricted from moving backward and rising so as to be prevented from moving into the cabin.

However, in the event of the structural arrangement for restraining the hood thus proposed previously, the hook is incorporated with the hinge and consequently the hinge must be designed to be in a specific shape. Further, since the stopper with which the hook engages is formed with a cowl panel or the like which is not superior in strength, it is required to reinforce sufficiently the cowl panel or the like forming the stopper in order to surely restrict the hood from moving backward and rising and this results in a disadvantage that the number of reinforcements combined with the vehicle body are increased.

OBJECTS AND SUMMARY OF THE INVENTION

Accordingly, it is an object of the present invention to provide an arrangement for restraining a hood of a vehicle body which avoids the aforementioned problem and disadvantage encountered with the prior art.

Another object of the present invention is to provide an arrangement for restraining a hood of a vehicle body, by which the hood is surely prevented from moving into a cabin formed in the vehicle body without increment in the number of reinforcements combined with the vehicle body, on the occasion of, for example, collision of the vehicle body with another.

A further object of the present invention is to provide an arrangement for restraining a hood of a vehicle body, by which the hood is surely prevented from moving into a cabin formed in the vehicle body with effective use of a reinforcement combined originally with a portion of the vehicle body where an opening forming an engine room, trunk room or the like is provided, on the occasion of, for example, collision of the vehicle body with another.

According to the present invention, there is provided an arrangement for restraining a hood of a vehicle body comprising a junction member attached to a corner portion of the behicle body where an end of a cowl panel extending along a lower end of a front windshield is coupled with a wheel apron member for reinforcing the corner portion, and a hook member projecting from the inner surface of the hood which is provided for opening and closing an opening formed in the vehicle body in front of the cowl panel so as to be positioned to face said junction member when the hood is positioned to close the opening, wherein the hook member engages with the junction member in the case where the hood is moved toward a cabin space formed in the vehicle body behind the cowl panel.

In the arrangement thus constituted in accordance with the present invention, the junction member which is provided for reinforcing the corner portion where the end of the cowl panel is coupled with the wheel apron member is effectively used as a stopper for receiving the hook projecting from the inner surface of the hood when the hood is moved toward the cabin space on the occasion of, for example, collision of the vehicle body with another. Accordingly, the hood is restrained from shifting by the junction member which is provided to be a reinforcement superior in strength and therefore prevented surely from moving into the cabin space without a stopper provided in particular with a reinforcement. Further, the number of parts used around the opening is not increased and consequently an increase in cost of production is not brought about.

The above, and other objects, features and advantages of the present invention will become apparent from the following detailed description which is to be read in conjunction with the accompanying drawings.

DESCRIPTION OF THE PREFERRED EMBODIMENT

The invention will now be described by way of example with reference to the accompanying drawings.

Figure 1:
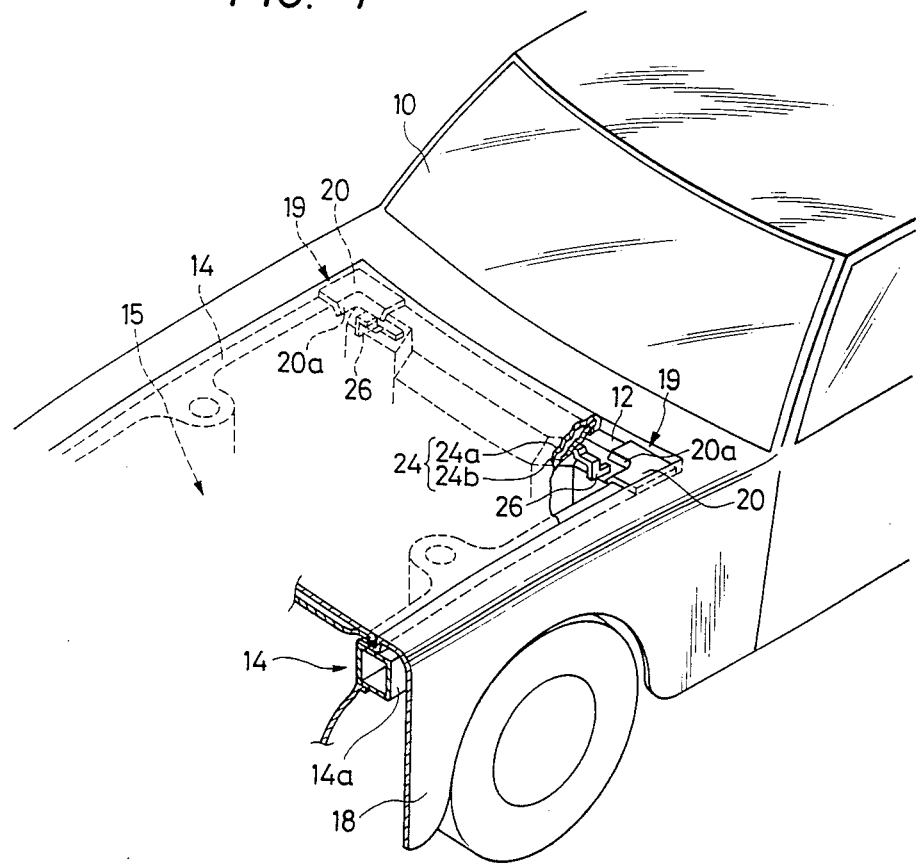
FIG. 1 is a schematic fragmentary perspective illustration showing one embodiment of arrangement for restraining a hood of a vehicle body according to the present invention, together with a front portion of the vehicle body to which the embodiment is applied.
Figure 2:
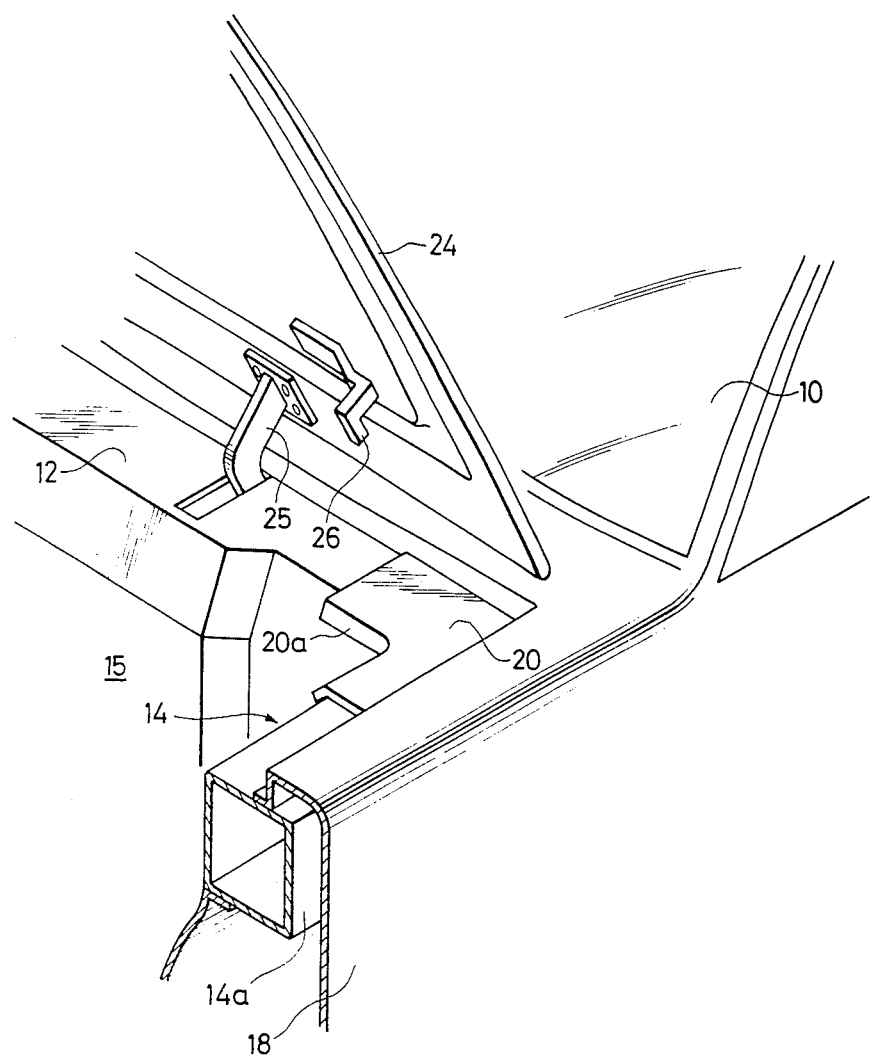
FIG. 2 is a schematic fragmentary enlarged perspective illustration showing the embodiment shown in FIG. 1.

FIGS. 1 and 2 show one embodiment of arrangement for restraining a hood of a vehicle body according to the present invention, together with a front portion of the vehicle body to which the embodiment is applied.

Figure 3:
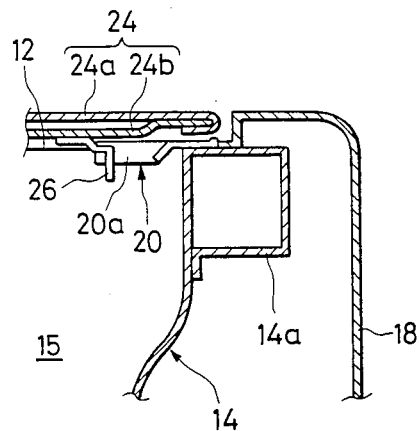
FIGS. 3 and 4 are schematic sectional views each showing a part of the embodiment shown in FIG. 1.

Referring to FIGS. 1 and 2, a cowl panel 12 is provided to extend in a direction of the width of a vehicle body along the lower end of a front windshield 10. Each end of the cowl panel 12 is coupled with one of a pair of wheel apron members 14 and thereby a pair of corner portions 19 of the vehicle body which face to an opening provided in the vehicle body for forming an engine room 15 are made. Each of the wheel apron members 14 is provided at its upper part with a frame portion 14a having a closed cross section. The frame portion 14a is created with an upper portion of the wheel apron member 14 which is bent at a plurality of positions thereon to be formed into a tubular shape and connected at an end thereof with the outer surface of the wheel apron member 14, as shown in FIG. 3. A front fender panel 18 is attached to each of the frame portions 14a of the wheel apron members 14 to cover the same from the outside, as shown also in FIG. 3.

Figure 4:
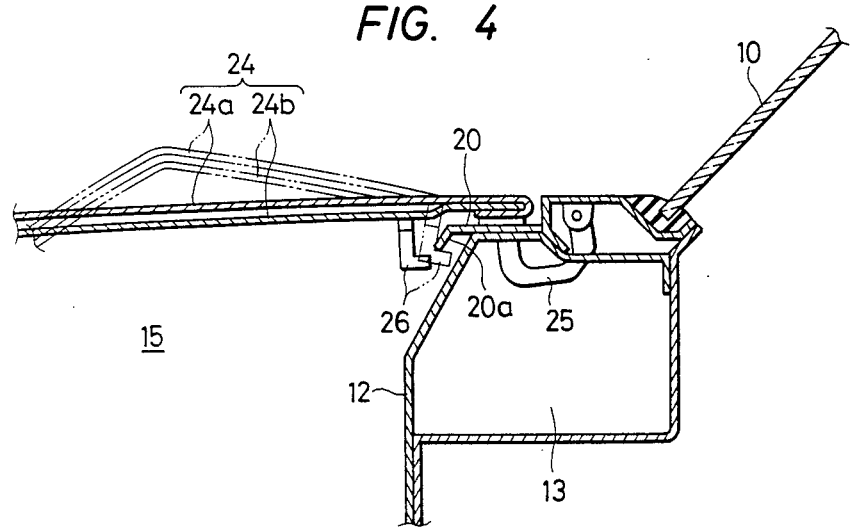

The cowl panel 12 is provided with a portion thereof forming a cowl box 13, which extends in the direction of the width of the vehicle body with a closed cross section, as shown in FIG. 4.

A junction member 20 which is a kind of reinforcement is attached to the upper surface of each of the corner portions 19 by means of welding, for example, so as to cover the corner portion 19. The junction member 20 is shaped into generally a flat plate with a portion connected to the upper surface of the cowl panel 12 and another portion connected to the upper surface of the frame portion 14a of the wheel apron member 14, and has a front fringe portion which is located in the engine room 15 and bent downward, as shown clearly in FIGS. 2 and 4. A part of the front fringe portion of the junction member 20 forms an engaging portion 20a for engaging with a hook member 26 explained later.

Further, a hood 24 is provided for opening and closing the engine room 15. The rear end portion of the hood 24 is supported by a hinge member 25 to be located in the vicinity of the upper portion of the cowl panel 12, as shown in FIGS. 2 and 4. The hood 24 comprises an outer panel 24a and an inner panel 24b connected with each other and a pair of hook members 26 are attached to the under surface of a rear portion of the inner panel 24b by means of, for example, welding to project downward, as shown in FIG. 1 and also more clearly in FIGS. 2 and 3. Each of the hook members 26 is formed into a shape of L bent toward the rear end portion of the hood 24 and positioned to face the engaging portion 20a formed with the part of the front fringe portion of the junction member 20 when the hood 24 is positioned to close the engine room 15.

With the structure thus constituted, in the case where an external force affects the hood 24 to push the same backward toward the front windshield 10, that is, toward a cabin space formed in the vehicle body behined the front windshield 10 and the cowl panel 12, on the occasion of, for example, collision of the vehicle body with another, the hook member 26 engages with the engaging portion 20a of the junction member 20 so that the hood 24 is restrained from moving backward and rising, as shown with dot-dash lines in FIG. 4. In this case, the junction member 20 which is origianlly combined with the vehicle body for reinforcing the corner portion 19 and superior in strength is effectively used as a stopper for receiving the hook member 26, and therefore the hood 24 is surely prevented from moving into the cabin space without a stopper provided in particular with a reinforcement.

When the hook member 26 engages with the engaging portion 20a so as to restrain the hood 24 from moving backward and rising, the hood 24 is bent upward, as shown with dot-dash lines in FIG. 4, to absorb shocks imposed thereto by the external force.

What is claimed is:

1. An arrangement for restraining a hood of a vehicle body comprising.
    a junction member attached to a corner portion of the vehicle body, where an end portion of a cowl panel extending along a lower end portion of a front windshield in a direction of the width of the vehicle body is coupled with a wheel apron member, for reinforcing said corner portion, and
    a hook member projecting from an inner surface of the hood which is provided for opening and closing an opening formed in the vehicle body in front of the cowl panel, so as to be positioned to face said junction member when the hood is positioned to close the opening, said hook member engaging with said junction member in the case where the hood is moved toward a cabin space formed in the vehicle body behind the cowl panel.

2. An arrangement according to claim 1, wherein said wheel epron member provided at an upper part thereof with a frame portion having a closed cross section and the end portion of said cowl panel is coupled with said frame portion.

3. An arrangement according to claim 2, wherein said frame portion of the wheel apron member is created with an upper portion of the wheel apron member which is bent at a plurality of positions thereon to be formed into a tubular shape and connected at an end thereof with an outer surface of the wheel apron member.

4. An arrangement according to claim 1, wherein said junction member is disposed to have a portion thereof connected with said cowl panel and another portion thereof connected to said wheel apron member.

5. An arrangement according to claim 4, wherein said wheel apron member provided at an upper part thereof with a frame portion extending in a direction of the length of the vehicle body and said another portion of the junction member is fixed to said frame portion.

6. An arrangement according to claim 4, wherein said junction member is provided with a front fringe portion thereof located in said opening and bent downward.

7. An arrangement according to claim 4, wherein said cowl panel is provided with a portion thereof forming a cowl box which extends in the direction of the width of the vehicle body with a closed cross section, and said portion of the junction member is connected to an upper surface of said portion of the cowl panel forming said cowl box.

8. An arrangement according to claim 5, wherein said another portion of the junction member is connected to an upper surface of said frame portion.

9. An arrangement according to claim 1, wherein said hood comprises an outer panel and an inner panel connected with each other and said hook member is attached to an under surface of said inner panel.

10. An arrangement according to claim 1, wherein said hook member is formed into a shape of L bent toward a rear end portion of said the hood.

11. An arrangement according to claim 10, wherein said junction member is provided with a front fringe portion thereof bent downward and located to face said hook formed into a shape of L when the hood is positioned to close the opening.

* * * * *